United States Patent
Murai et al.

[11] Patent Number: 5,170,442
[45] Date of Patent: Dec. 8, 1992

[54] CHARACTER PATTERN TRANSFORMING SYSTEM

[75] Inventors: Kiyoaki Murai; Akio Nagai, both of Suwa, Japan

[73] Assignee: Seiko Epson Corporation, Tokyo, Japan

[21] Appl. No.: 241,287

[22] Filed: Sep. 7, 1988

[30] Foreign Application Priority Data

Sep. 8, 1987 [JP] Japan ................. 62-224416
Oct. 15, 1987 [JP] Japan ................. 62-260636
Oct. 26, 1987 [JP] Japan ................. 62-269593

[51] Int. Cl.$^5$ .......................................... G06K 9/42
[52] U.S. Cl. .......................................... 382/47; 382/50
[58] Field of Search .................... 382/47, 50; 358/22, 358/451; 340/731

[56] References Cited

U.S. PATENT DOCUMENTS

| | | | |
|---|---|---|---|
| 3,784,981 | 1/1974 | Borowski et al. | 382/47 |
| 4,578,812 | 3/1986 | Yui | 382/47 |
| 4,633,503 | 12/1986 | Hinman | 382/47 |
| 4,742,556 | 5/1988 | Davis, Jr. et al. | 382/47 |
| 4,829,587 | 5/1989 | Glazer et al. | 382/47 |

Primary Examiner—Leo H. Boudreau
Attorney, Agent, or Firm—Blum Kaplan

[57] ABSTRACT

Character pattern transforming system providing a character pattern whose size can be reduced or enlarged with an optional scale factor includes a gray scale device providing a plurality of values per pixel for adjusting the gray scale associated with the character pattern. The system further includes a pixel positioning circuit for determining the position of each pixel of the reduced or enlarged character pattern and a pixel coloring circuit for determining which of the pixels in the reduced or enlarged character pattern is to be colored based on the gray scale data. The thickness of the vertical lines of the transformed character pattern can be adjusted following enlargement or reduction of the character pattern. A detector circuit identifies right angle corners of the original character pattern to ensure that such right angle corners are maintained in the transformed character pattern.

48 Claims, 15 Drawing Sheets

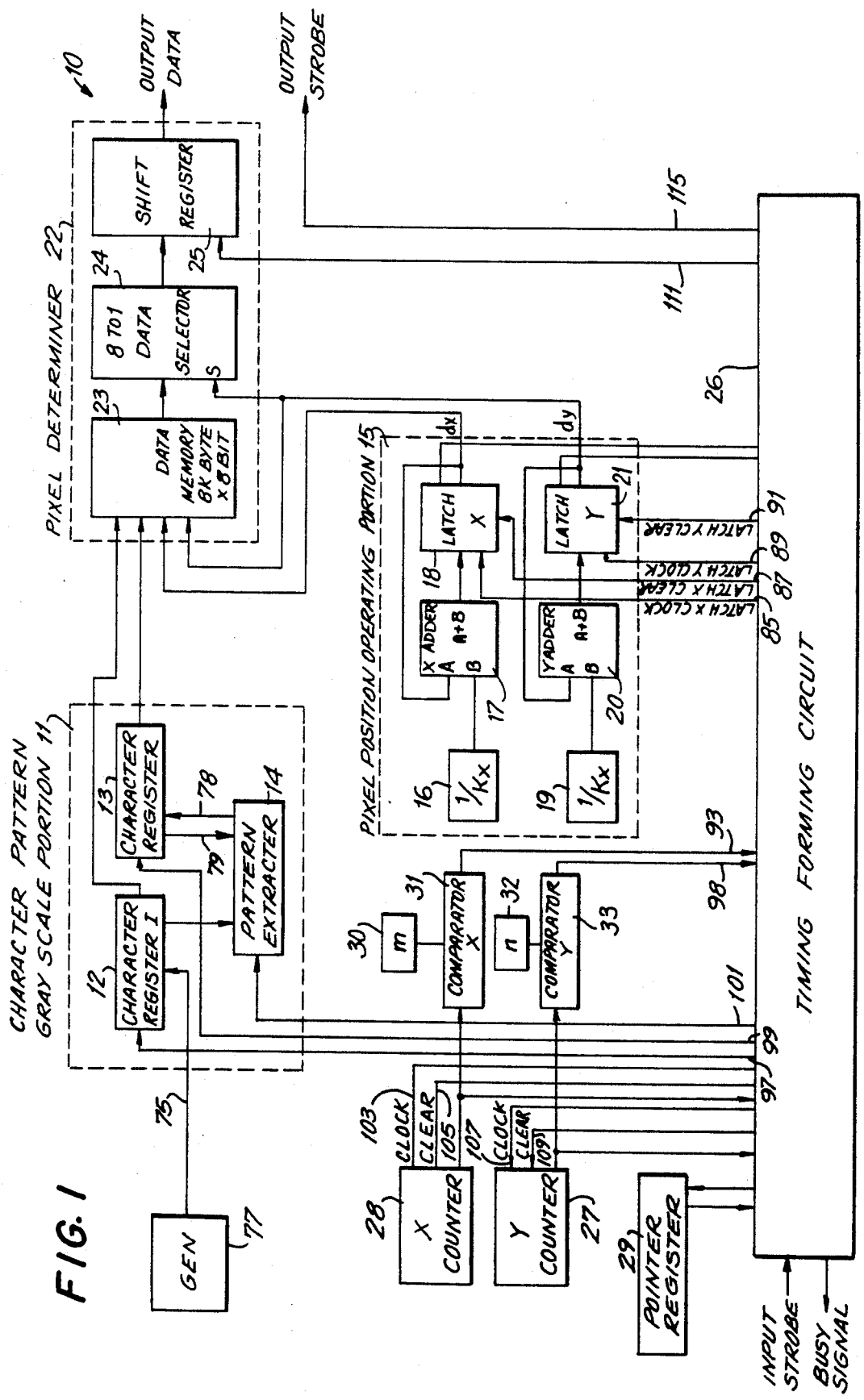

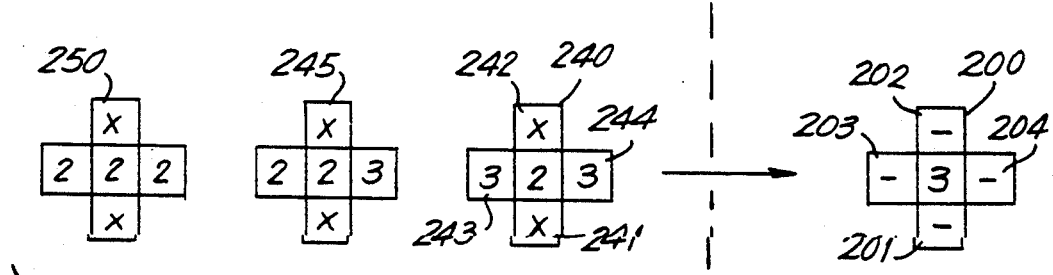
FIG. 3a
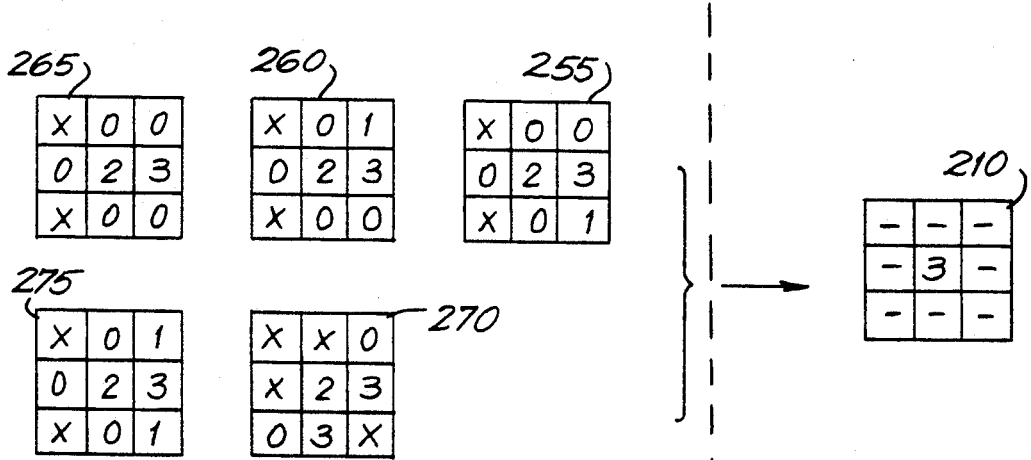
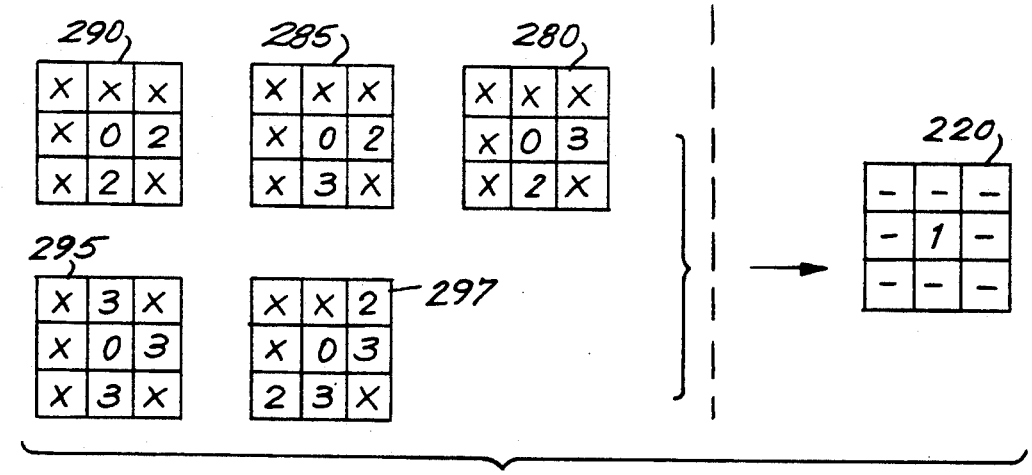
X ··· DON'T CARE
− ··· NO CHANGE
FIG. 3b

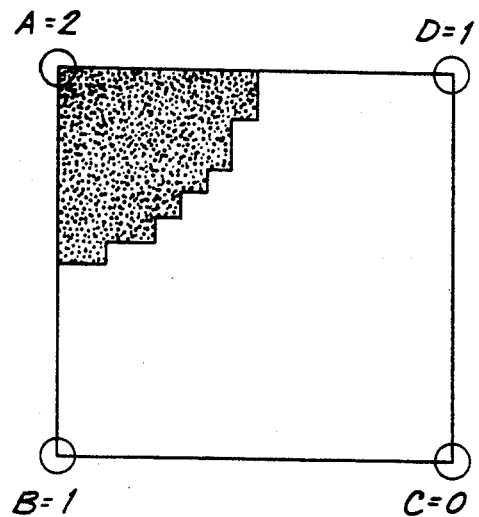
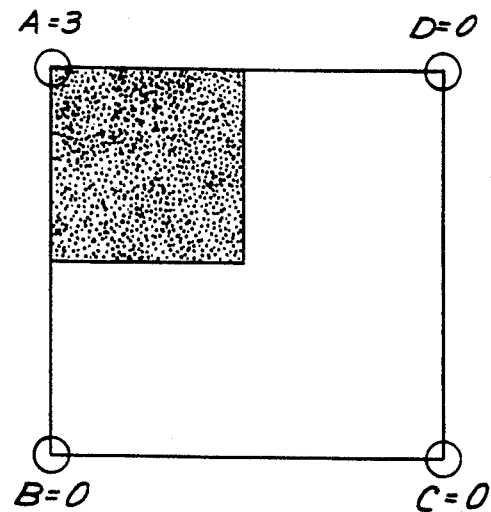
FIG. 7a  FIG. 7b
| A | B | C | D | TREATMENT SYSTEM |
|---|---|---|---|---|
| 3 | 0 | 0 | 0 | II |
| 0 | 3 | 0 | 0 | II |
| 0 | 0 | 3 | 0 | II |
| 0 | 0 | 0 | 3 | II |
| 0 | 3 | 3 | 3 | II |
| 3 | 0 | 3 | 3 | II |
| 3 | 3 | 0 | 3 | II |
| 3 | 3 | 3 | 0 | II |
| OTHERS | | | | I |
OPERATION SYSTEM I: SMOOTH
OPERATION SYSTEM II: RECTANGLE
FIG. 8

FIG. 11a
IN MAGNIFICATION
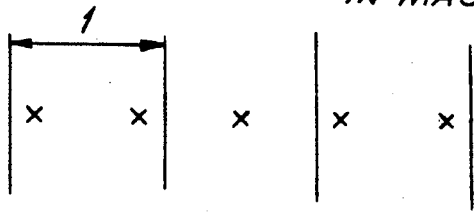
FIG. 11b
IN REDUCTION
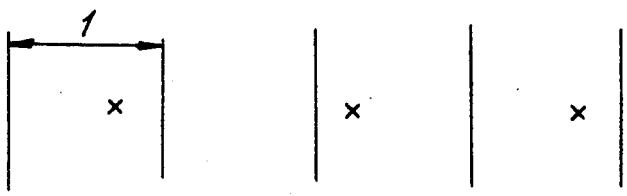
FIG. 12
| ADDRESS | CONTENTS |
|---|---|
| 0 0 0 0 0 0 0 0 0 0 0 0 0<br>〜<br>0 0 0 0 1 1 1 1 1 1 1 1 | CHARACTER REGISTER 12 |
| 0 0 0 1 0 0 0 0 0 0 0 0<br>〜<br>1 1 1 0 1 1 1 1 1 1 1 1 | TABLE |
| 1 1 1 1 0 0 0 0 0 0 0 0<br>〜<br>1 1 1 1 1 1 1 1 1 1 1 1 | CHARACTER REGISTER 13 |

CHARACTER INFORMATION (SUBORDINATION BIT OF CHARACTER PATTERN GRAY SCALE DATA)

CHARACTER PATTERN TRANSFORMING SYSTEM

BACKGROUND OF THE INVENTION

The invention relates generally to a character pattern transforming system, and more particularly to generating an enlarged or reduced pattern of characters for use in printers, display devices or the like.

Character pattern generators are an indispensable portion of an information treatment system (e.g. printers and display devices) and, in particular, of a character pattern transforming system in which the character pattern is produced based on an optional scale factor for reducing and enlarging the size of each character of the pattern. Characters include letters of the alphabet, numerals, symbols and so on.

A character pattern configured as a dot matrix includes a plurality of dots (i.e. pixels) which are white (uncolored) or black (colored). Each dot is assigned a binary value of either 0 or 1 representing either the white or black color. A dot matrix character pattern of, for example, 16×16 dots can be enlarged to form a dot matrix character pattern of size 30×30 dots by several different methods.

The first method for enlargement of a character pattern involves mapping the positional coordinates of each dot having a binary value of 1 within the original character pattern based on a scaling factor. The second method involves multiplying the values of a selected row and column of the dot matrix in accordance with a scaling factor and then inserting the result as part of the enlarged matrix. The third method includes dividing the original character pattern into small-sized partial patterns and replacing each of these partial patterns with a partial pattern of the enlarged character pattern based on the scaling factor.

The present invention involves the first method, that is, mapping the positional coordinates of each dot within the original character pattern having a value of 1 to create an enlarged character pattern. This method is otherwise known as a pixel density conversion method. The invention is to be used with a system as shown in Japanese Laid Open Patent Application No. 58-151771.

Conventional character pattern transforming systems involving the pixel density conversion (i.e. first) method has in the past produced characters of poor quality. The second and third methods, discussed above, require a significant period of processing time. It is also difficult to enlarge or reduce a character whose scale factor may be varied using either the second or third methods.

Accordingly, it is desirable to provide a character pattern transforming apparatus which can transform character patterns at high speed, produce high quality characters and permit use of optional scale factors.

SUMMARY OF THE INVENTION

Generally speaking, in accordance with the invention, a character pattern transforming system for changing the size of an original character pattern based on a scaling factor includes a character pattern circuit for providing an original character pattern represented by a first dot matrix of pixels, a gray scale circuit for converting the original character pattern into character pattern gray scale data having at least ternary values per pixel. The system also includes a pixel positioning circuit for determining the pixel positions of a transformed dot matrix representing a transformed character pattern based on a scaling factor applied to the original character pattern. A pixel color determining circuit determines the color of each pixel of the transformed character pattern within the second dot matrix based on the character pattern gray scale data. The pixel color determining circuit includes a detector circuit for detecting right angle portions of the original character pattern based on the character pattern gray scale data. Through such detection, characters can be enlarged or reduced while maintaining well defined right angled corners.

The system also includes a correction circuit for adjusting the thickness of the characters forming the transformed character pattern. In one preferred embodiment of the invention, the correction circuit includes a pointer for identifying that portion of the transformed dot matrix representing the transformed character pattern whereby the correction circuit adjusts to the thickness of the identified portion based on the scaling factor applied to the original character pattern following identification by the pointer.

In another embodiment of the invention the gray scale circuit does not extract original character patterns from the dot matrix but rather leaves such extraction as an option to be implemented by the user. Preferably, the alternative gray scale storage circuit employs two read-only-memories (ROM), one of which receives the character pattern represented by the first dot matrix.

Accordingly, it is an object of the invention to provide an improved character pattern transforming system which produces a high quality enlarged or reduced character pattern within a dot matrix at high speed.

It is another object of the invention to provide an improved character pattern transforming system which employs optional scale factors while reducing the processing time for producing enlarged and reduced character patterns compare to conventional character pattern transforming systems.

It is a further object of the invention to provide an improved character pattern transforming system which enlarges and reduces the original character pattern formed from a dot matrix based on a scaling factor applied to the original character pattern.

It is yet another object of the invention to provide an improved character pattern transforming system which maintains the right angle peripheries of the original character pattern after character pattern enlargement or reduction.

Still other objects and advantages of the invention will in part be obvious and will in part be apparent from the specification.

The invention accordingly comprises the several steps and a relation of one or more such steps with respect to each of the others, and the system embodying features of construction, a combination of elements and arrangements of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a block circuit diagram of a character pattern transforming circuit in accordance with a first embodiment of the invention;

FIGS. 3(a) and 3(b) are examples of character pattern gray scale data after extraction;

FIGS. 7(a) and 7(b) illustrate the contents of two subtables;

FIG. 8 is a table representing the type of treatment system to be applied to and based on the character pattern gray scale data;

FIGS. 11(a) and 11(b) illustrate an enlarged and reduced fragmentary portion of a dot matrix, respectively;

FIG. 12 is a table of addresses for the pair of registers and a reference table of the system;

DETAILED DESCRIPTION OF THE PREFERRED EMBODIMENTS

Figure 2A:
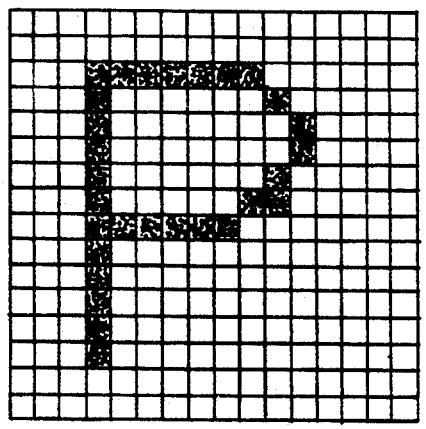
FIGS. 2(a) and 2(b) illustrate character patterns stored within a pair of registers of the system.

As shown in FIG. 1, a character pattern transforming system 10 includes a character pattern gray scale portion 11, a pixel position operating portion 15 and a pixel determiner 22. Gray scale portion 11 converts a character pattern to gray scale data. Pixel position operating portion 15 determines (i.e. enumerates) the position of each pixel within a transformed character pattern which has been transformed (i.e. enlarged or reduced) in size. The new pixel positions determined by operating portion 15 are based on a scale factor applied to the original character pattern. Pixel determiner 22 determines the color of each pixel in the transformed character pattern, that is, whether it is to be colored (black) or uncolored (white).

The character pattern is formed within and represented by a dot matrix which is supplied to gray scale portion by a character pattern generator 77 (or some other suitable source) on an input data line 75. System 10 also includes a Y counter 27 and an X counter 28 which are used for counting the number of dots/pixels in vertical and horizontal directions of the character pattern, respectively. System 10 also includes a timing forming circuit 26 and a pointer register 29. Pointer register 29 stores particular positions of the character pattern by row and column for adjusting the thickness of the latter after it has been enlarged or reduced so that the relative thickness of the various lines within each character pattern and of each character pattern on the same display line prior to and after transformation are maintained.

Character pattern gray scale portion 11 extracts an original character pattern from the dot matrix provided by character pattern generator 77 along input data line 75 and converts the extracted character pattern into character pattern gray scale data having gray scale information of two bits per pixel. Gray scale portion 11 includes a character register 12, a character register 13 and a pattern extracter 14. Character registers 12 and 13 are of the same or of a larger size than the original character pattern. For example, when the size of the original inputted character pattern is 16×16 dots, registers 12 and 13 will have storage capacity of at least 16×16 dots.

Once the character pattern as represented by the dot matrix has been loaded (i.e. stored) in character register 12, the pattern is extracted by pattern extractor 14 which then stores the extracted character pattern in character register 13. The gray scale data (i.e. concentration of the character pattern within the dot matrix) is represented by combining the contents of register 12 with register 13 in a manner explained in greater detail below.

Figure 2B:
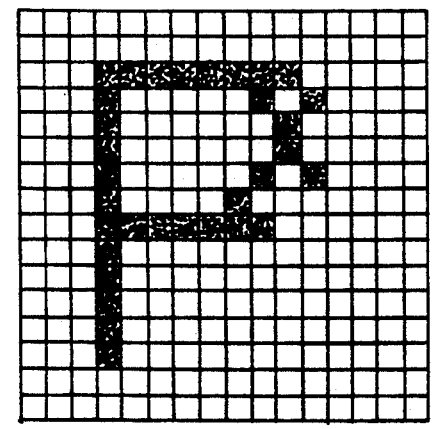

FIG. 2(a) represents the character pattern stored in character register 12 as provided by input data line 75. FIG. 2(b) represents the character pattern stored in character register 13 after the second step of pattern extraction as explained in greater detail below. The gray scale data for each pixel of the dot matrix is represented by a pair of bits, that is, the superordination and subordination bits which are stored in character registers 12 and 13, respectively. The gray scale data is represented by one of four values, that is, 0, 1, 2 or 3 (i.e. ternary values per pixel). The values shown in FIGS. 2(a) and 2(b) are the decimal equivalents of the binary values actually stored in registers 12 and 13, respectively.

Figure 2C:
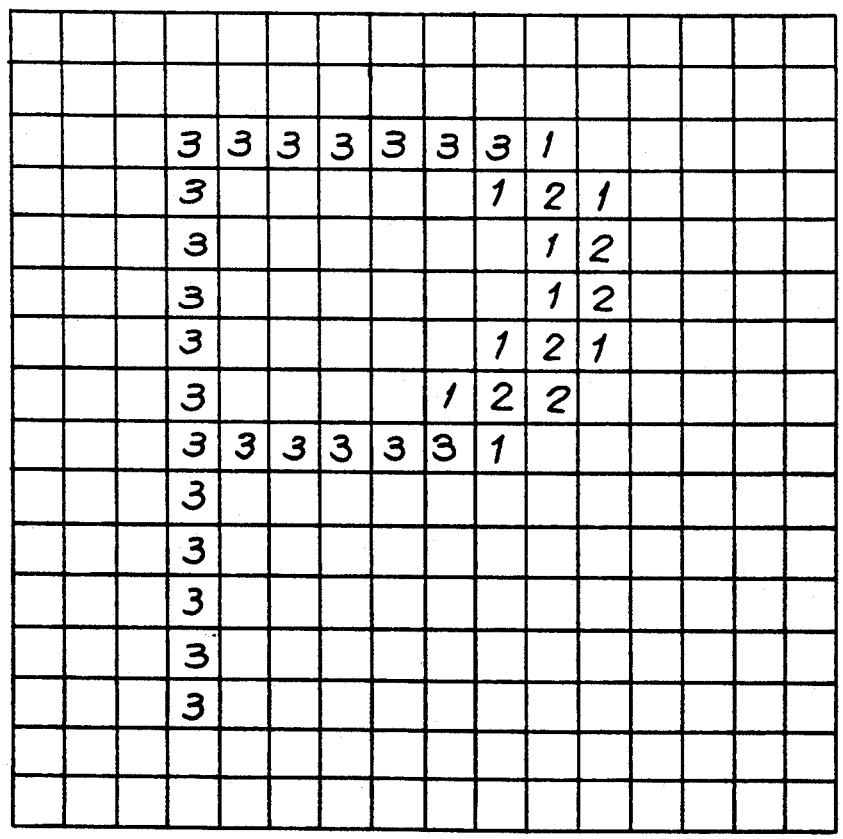
FIG. 2(c) is a representation of character pattern gray scale data produced by the apparatus based on the character patterns shown in FIGS. 2(a) and 2(b)

FIG. 2(c) illustrates an example of character pattern gray scale data based on the character patterns stored in character registers 12 and 13 shown in FIGS. 2(a) and (b), respectively. Each pixel of character pattern gray scale data within the matrix in FIG. 2(c) has a value of either 0, 1, 2 and 3 (i.e. binary values of 0,0; 0,1, 1,0 or 11). The values of 0 are omitted from the matrix in FIG. 3.

Operation of pattern extracter 14 is as follows: Input data is initially loaded into character register 12 as shown in FIG. 2(a). Character register 13, at this time, has only values of 0 stored therein. Pattern extractor 14 then examines the contents of character registers 12 and 13 and provisionally decides the new contents of character register 13, that is, the subordination bit for each pixel of character pattern gray scale data. The provisional contents of character pattern register 13 are supplied by pattern extracter 14 along a line 78. Providing the provisional contents for character register 13 represents the first step in pattern extraction. A line 79 connected between pattern extracter 14 and character register 13 supplies the provisional contents of character register 13 to pattern extracter 14. At the same time the contents of character register 12 is once again provided to pattern extractor 14. A final determination of the contents for character register 13 is now made by pattern extracter 14 and supplied to character register 13 along line 78. Determining the final contents of character register 13 represents the second step in pattern extraction.

FIGS. 3(a) and 3(b) illustrate examples of pixel patterns of 3×3 dots extracted by and after being operated upon by pattern extracter 14. The first and second steps in extracting a pattern are represented by FIGS. 3(a) and 3(b), respectively. Thirteen different kinds of extracted patterns (i.e. 240, 245, 250, 255, 260, 265, 270, 275, 280, 285, 290, 295 and 297) are shown in region A of FIGS. 3(a) and 3(b). Pattern extracter 14 after extracting one of these thirteen patterns operates on the pixel value within the center of the pattern and changes its value depending on the position and values of the other pixels within the pattern. The new value of the center pixel is shown in region B of FIGS. 3(a) and 3(b) as patterns 200, 210 and 220. More particularly, extracted patterns 240, 245 or 250 will result in a pattern 200. Extracted patterns 255, 260, 265, 270 or 275 will result in pattern 210. Extracted patterns 280, 285, 290, 295 or 297 will result in a pattern 220. The values of x within the thirteen patterns 200, 210 and 220 represent values which do not matter in determining patterns 200, 210 and 220. The dashed lines in patterns 200, 210 and 220 represent values which have not changed from corresponding portions within the thirteen patterns shown in region A. For example, pattern 240 extracted from pattern extracter 14 will be changed by pattern extracter 14 to pattern 200 with pixels 201, 202, 203 and 204 having the same values as pixels 241, 242, 243 and 244 of pattern 240, respectively. The patterns within region A are symmetric about their centers and therefore can be rotated about their centers resulting in the same extracted patterns 200, 210 and 220.

The extraction of a character pattern by pattern extracter 14 is controlled by timing forming circuit 26 with the first step of extraction (FIG. 3(a)) followed by the second step of extraction (FIG. 3(b)). Character pattern gray scale data outside the character pattern is treated as having a value of 0 and need not be extracted.

Figures 4A, 4B, 4C, 4D:
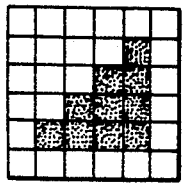
FIG. 4(a) is an example of character pattern input data.
FIG. 4(b) illustrates the character patterns initially stored in two registers of the system and corresponding character pattern gray scale data.
FIG. 4(c) illustrates the character patterns stored in two registers of the system after the first step of extraction and corresponding character pattern gray scale data.
FIG. 4(d) illustrates the character patterns stored in two registers of the system after the second step of extraction and corresponding character pattern gray scale data.

The contents of registers 12 and 13 during pattern extraction are shown in FIGS. 4(a)-(d). FIG. 4(a), for exemplary purposes only, illustrates a character pattern representing a 6×6 dot matrix. The binary values of the character pattern of FIG. 4(a) are loaded into character register 12 of FIG. 4(b). Character register 13 of FIG. 4(b) has not yet received any data from pattern extracter 14 and therefore has only 0 values. The character pattern gray scale data of FIG. 4(b) is shown as a decimal value and is based on the contents of character register 12 and character register 13 (i.e. the superordination bit and subordination bit for each pixel, respectively, of the character pattern illustrated in FIG. 4(a)). FIG. 4(c) illustrates the first step in pattern extraction. More particularly, the contents of character register 13, shown in FIG. 4(c), is provided by pattern extracter 14 based on the latter's examination of the contents of character register 12. The contents of character registers 12 and 13 are shown as binary values with the resulting character pattern gray scale data represented as an equivalent decimal value. The second step of pattern extraction is shown in FIG. 4(d). Pattern extracter 14 examines the contents of character registers 12 and 13 of FIG. 4(c) to arrive at the final contents for character register 13 of FIG. 4(d). Binary values are shown for character registers 12 and 13 in FIG. 4(d). The resulting character pattern gray scale data of FIG. 4(d) are represented by decimal values. Character register 12 throughout the steps of pattern extraction does not change its contents. Rather, the steps of pattern extraction involve only changing the contents of character register 13, that is, the subordination bits of each pixel to provide suitable character pattern gray scale data.

Pixel position operating portion 15 determines (i.e. enumerates) the position of each pixel within an enlarged or reduced character pattern. The position of each pixel is determined based on a scale factor which corresponds to the enlargement or reduction in size of the original character pattern size. The scale factor includes a horizontal factor Kx and a vertical factor Ky. Horizontal factor Kx represents the enlargement or reduction of the original character pattern in a horizontal direction. Vertical factor Ky represents the enlargement or reduction of the original character pattern in a vertical direction.

Pixel position operating portion 15 includes a pair of registers 16 and 19 for storing the reciprocals of horizontal factor Kx and vertical factor Ky, respectively. Portion 15 also includes an X adder 17 and an Y adder 20. X adder 17 and Y adder 20 each have a B input for receiving the reciprocal of horizontal factor Kx and vertical factor Ky outputted from registers 16 and 19, respectively. X adder 17 and Y adder 20 also each include an A input. The respective outputs from X adder 17 and Y adder 20 represent the addition of the A and B inputs.

A latch X 18 and a latch Y 21 receive the outputs from X adder 17 and Y adder 20, respectively. The output from latch X 18 is provided to the A input of X adder 17 and as an input to a data memory 23 of pixel determiner 22. The output of latch Y 21 is provided as an input to the A input of Y adder 20 and as an input to a data selector 24 of pixel determiner 22. A latch X clock line 85 connected between timing forming circuit 26 and latch X 18 provides clock signals for clocking the output from X adder 17 into latch X 18. A latch X clear line 87 from timing forming circuit 26 to latch X 18 clears the contents of latch X 18. A latch clock line 89 from timing forming circuit 26 to latch Y 21 clocks the output from Y adder 20 into latch Y 21. A latch Y clear line 91 from timing forming circuit 26 to latch Y 21 clears the contents of latch Y 21.

Figure 5:
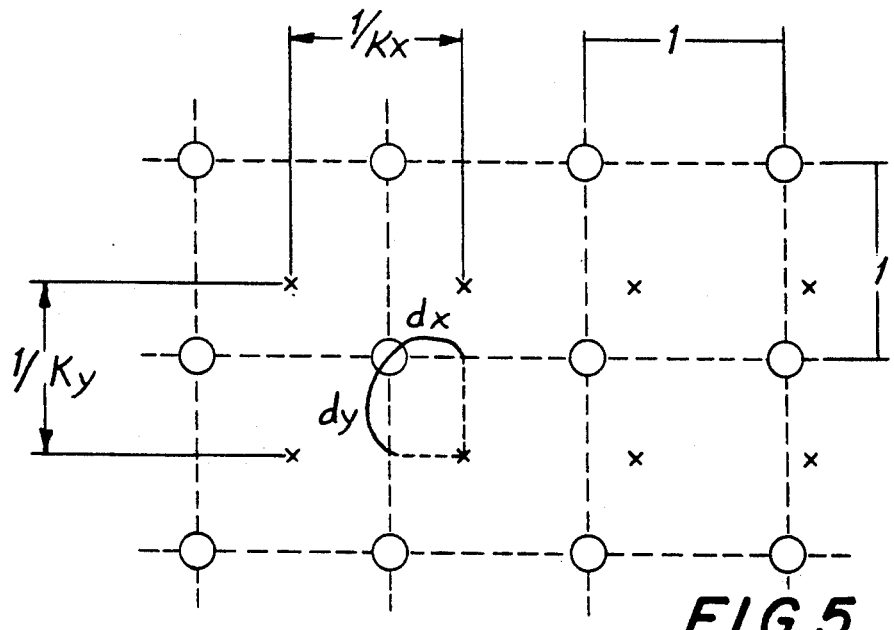
FIG. 5 illustrates, in part, the original and transformed dot matrixes.

FIG. 5 illustrates the pixel positions of the character pattern after enlargement or reduction relative to the original character pattern provided on input data line 75. Each "0" represents the center of a pixel in the original character pattern (i.e. before enlargement or reduction). Each "X" represents the center of a pixel of the character pattern after enlargement or reduction. The length between each pair of 0's represents a basic length of, for example, 1 in the horizontal direction and in the vertical direction. The horizontal distance between each pair of X's represents the reciprocal of the horizontal scale factor Kx (i.e. 1/Kx). The distance between each pair of X's in the vertical direction represents the reciprocal of the vertical factor Ky (i.e. the 1/Ky).

In determining the position of each pixel within the character pattern after enlargement or reduction in a horizontal direction the value of 1/Kx is added to the value which is stored in latch X 18. The position of each pixel within the character pattern after enlargement or reduction in the Y direction is determined by adding the value of 1/Ky to the value stored in latch Y 21. The results of these additions in the X and Y directions are stored in latch X 18 and latch Y 21, respectively.

The value stored in latch X 18 and latch Y 21 will have integer and decimal portions. The decimal portion of the value stored in latch X 18 represents a distance dx, that is, the distance between X and 0 in a horizontal direction. The decimal portion stored in latch Y 21 represents a distance dy, that is, the distance between X and 0 in a vertical direction. The integer value stored in latch X 18 represents the number of 0 pixels skipped over to arrive at the position of the X pixel in a horizontal direction. Similarly, the integer portion of the value stored in Y 21 represents the number of 0 pixels skipped over to arrive at the position of the X pixel in the vertical direction.

The outputs of latch X 18 and latch Y 21 are supplied to timing forming circuit 26 to control the clock signals fed along a pair of clock lines 103 and 107 to X counter 28 and Y counter 27, respectively. The bit number of the integer portion stored in latch X 18 and latch Y 21 is determined by the range of scale factors required. When the scale factor is not less than 0.5 times, the bit number is 2. Since the bit number of the decimal portion stored in latch X 18 and latch Y 21 is determined by the scale factor, dx and dy are represented by the total number of bits or some lesser number of bits. In case of latch X 18 or latch Y 21 having eight bits, with integer portion using two bits, the decimal portion dx or dy can use at most six bits. When the dx or dy portion uses all six bits, the scale factor is improved (i.e., greater accuracy). The decimal portion dx or dy can also use less than six bits (i.e., one to five bits).

Pixel determiner 22 determines whether each transformed pixel is to be colored (i.e. black) or uncolored (i.e. white). Such determination is based on the character pattern gray scale data supplied from portion 11. The character pattern gray scale data is used as a reference in order to decide whether each transformed pixel is black or white. Memory 23 stores reference table data. The reference table data represents the color (i.e., black or white) of the pixels in the transformed matrix and is based on the gray scale data outputted from character pattern gray scale portion 11 and the distances dx and dy outputted from pixel portion operating portion 15.

Figure 6A:
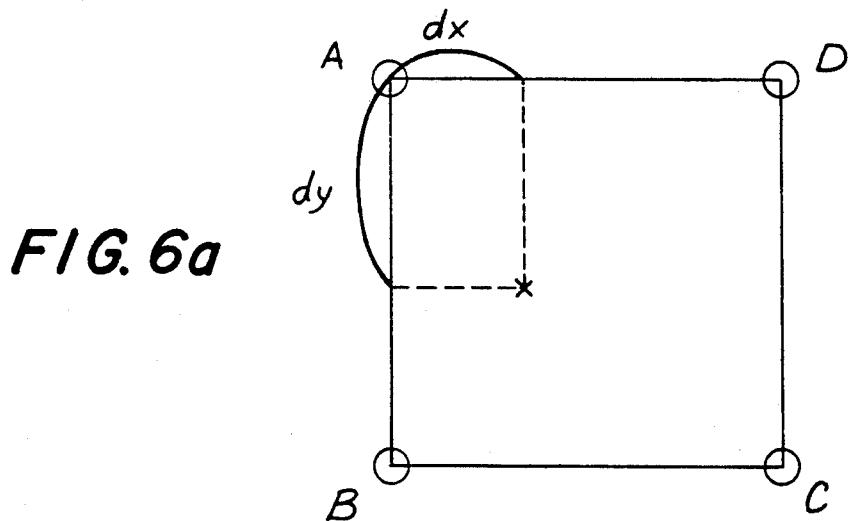
FIG. 6(a) illustrates a subtable of a memory of the system.
Figure 6B:
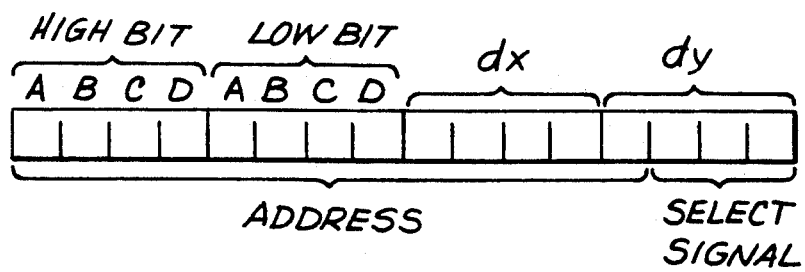
FIG. 6(b) illustrates the format for one row of the subtable.

FIGS. 6(a) and (b) illustrate the method for forming a subtable of the reference table. As shown in FIG. 6(a), each transformed pixel X is represented by four pixels A, B, C and D surrounding transformed pixel X and by distances dx and dy. Pixels A, B, C and D represent a portion of the character pattern gray scale data. As shown in FIG. 6(b), the gray scale data and distances dx and dy supplied to pixel determiner 22 are placed together to form an address and select signal for a row of data stored in memory 23. More particularly, the high (superordination) bits of pixels A, B, C and D are supplied by character register 12 and are used to form the first four bits of the row representing transformed pixel X within the reference table. The next four bits of the row representing transformed pixel X represent the low (superordination) bits of pixels A, B, C and D which are supplied from character register 13. The last eight bits of the row representing transformed pixel X are distances dx and dy.

The first thirteen bits of the row represent the address within data memory 23. The las three bit of the row represent the select signal which is used to select the data representing either the high or low bits of pixels A, B, C or D (i.e. one bit of data from eight bits of data). Once the word representing pixel X has been formed in data memory 23, the black or white color of pixel X is determined by data selector 24 of pixel determiner 22. The dy output of latch Y 21 supplied to data selector 24 determines which of the eight data bits is selected.

Figure 6C:
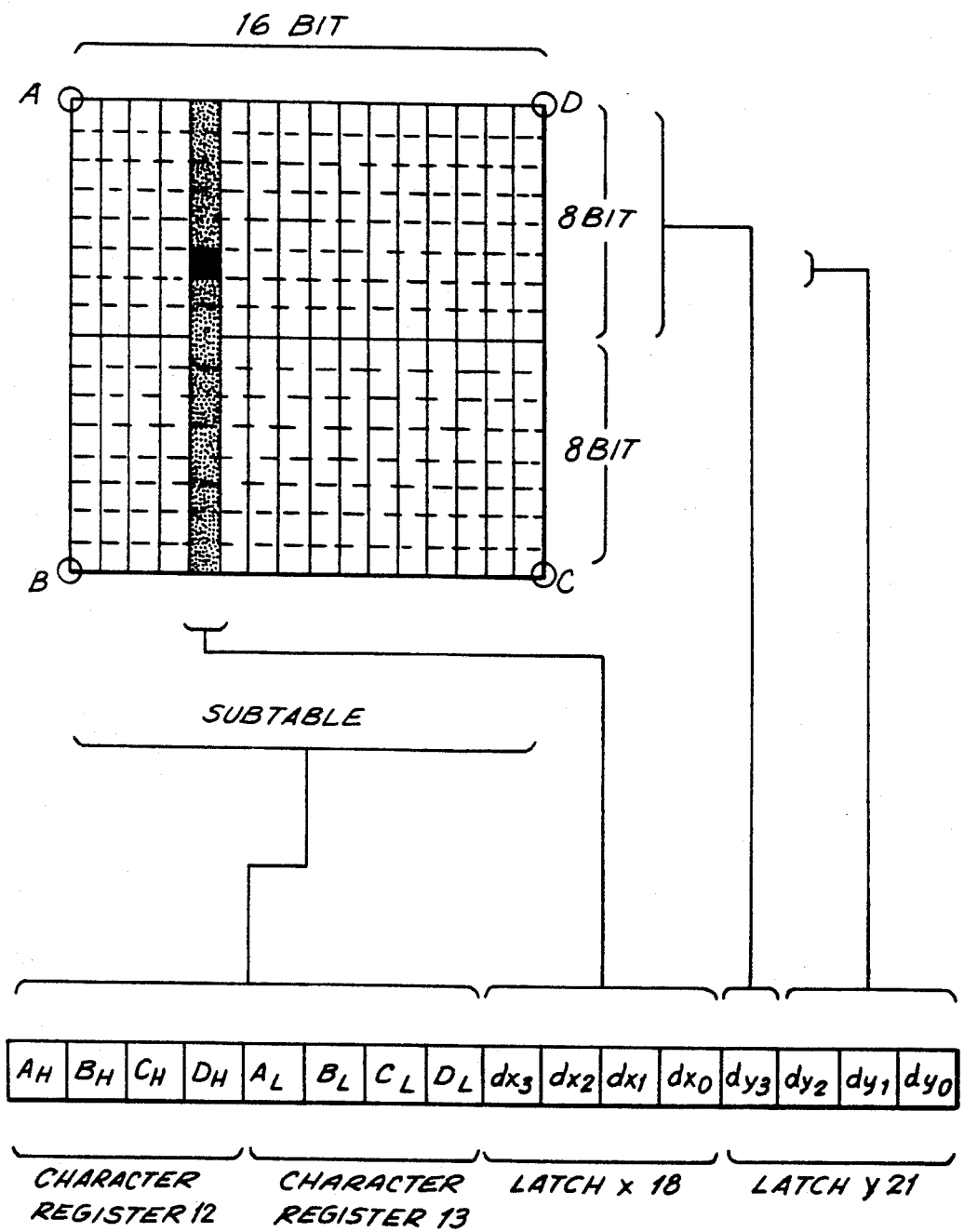
FIG. 6(c) diagrammatically illustrates the subtable of FIG. 6(a) and row of FIG. 6(b)

A more detailed illustration of a subtable having 16×16 bits and an address and select value are shown in FIG. 6(c). The pixel chosen, shown as a darkened box, is based on the value stored in latch X 18 representing a particular column within the subtable and the value stored in latch Y 21 representing the particular row to be selected.

A shift register 25 of pixel determiner 22 outputs the results of the position and color of pixel X. An output word from shift register 25 represents eight pixels of data. A clock signal sent along a clock signal line 111 from timing forming circuit 26 controls the output of shift register 25. Additionally, when shift register 25 is ready to output, timing forming circuit 26 also outputs an output strobe signal to communicate to a central processing unit (not shown) that the output data from shift register 25 is ready to be sent.

FIGS. 7(a) and (b) illustrate the contents of two subtables of the reference table. Each subtable includes the character pattern gray scale data at four point (i.e. pixels A, B, C and D) which surround transformed pixel X. Each pixel has a subtable. Accordingly, for a dot pattern of 16×16 pixels, a reference table having 256 subtables is required. The black and white colors of each subtable are represented by the values of 1 and 0, respectively. One bit is selected from each selected subtable based on the values of dx and dy. The contents of each subtable, that is, the gray scale data, is determined by any suitable method based on the gray scale data of pixels A, B, C and D. When the gray scale data has a value of 1.5 or more, the color of the transformed pixel is considered to be black. Therefore, pixel X would have no color (i.e. white) for gray scale data having a value of 1.0.

The edge of the character pattern, that is, its border is determined by one of two different types of treatment applied thereto, namely, a smooth or rectangular type of treatment. For smooth enlargement or reduction, a treatment system I is applied as shown in FIG. 7(a). A rectangular treatment system II is applied for providing right angle corners as shown in FIG. 7(b).

The type of treatment system used depends on the character pattern gray scale data at pixels A, B, C and D. The selection standard to be used is shown in FIG. 8. When one of the four pixels A, B, C or D has a gray scale data value of 3 (binary value (1,1)) and the other three pixels having values of 0 or when one of these four pixels has a gray scale data value of 0 while the other three pixels have gray scale data values of 3 (binary value (1,1)), rectangular treatment system II is applied after enlargement or reduction of the character pattern has been attained. As can be seen in FIG. 7(b), applying treatment system II will achieve a rectangular enlargement or reduction of the character pattern. All other combinations of gray scale data values for pixels A, B, C and D will result in smooth treatment system I being applied to the character pattern after enlargement or reduction is attained.

Figures 9A, 9B:
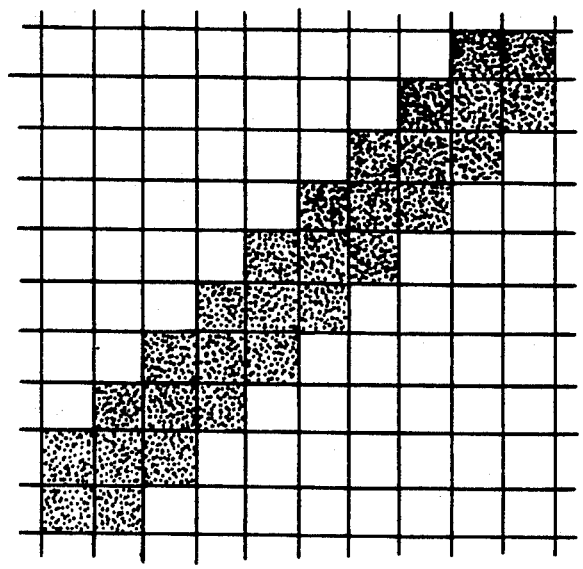
FIGS. 9(a) and 9(b) illustrate the first example of the values assigned to and the actual coloring of enlarged character pattern gray scale data, respectively.

FIG. 9(a) illustrates the gray scale data values of an enlarged orthogonal line. FIG. 9(b) illustrates the orthogonal line of FIG. 9(a) with the smooth treatment system I applied to color the same.

Figure 10A:
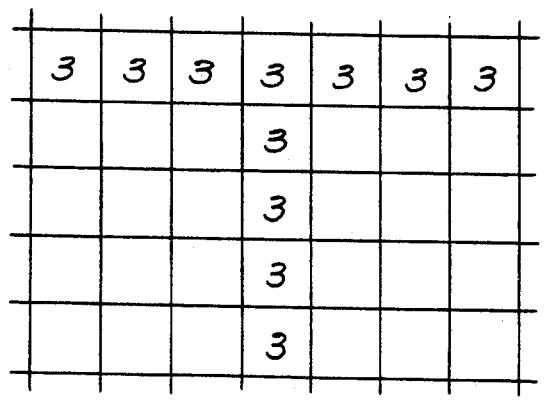
FIG. 10(a) is a second example of the values assigned to enlarged character pattern gray scale data.
Figure 10B:
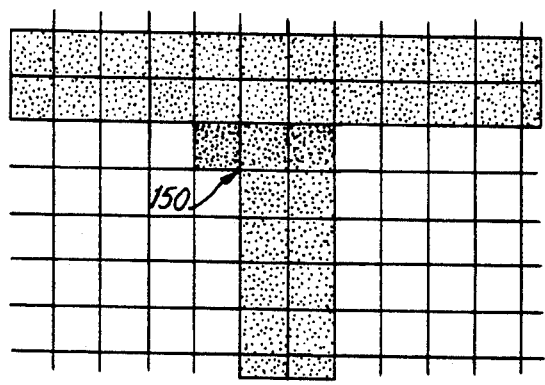
FIGS. 10(b) and 10(c) illustrate the actual coloring of the enlarged character pattern of FIG. 10(a) using a smooth treatment system and rectangle treatment system, respectively.
Figure 10C:
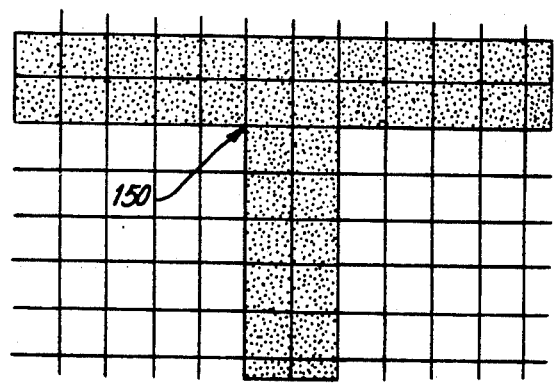

FIG. 10(a) illustrates the gray scale data values for an enlarged T shaped character pattern. FIGS. 10(b) and (c) illustrate application of the smooth treatment system I and rectangular treatment system II applied after the enlarged character pattern of FIG. 10(a) has been created, respectively. By applying smooth treatment system I to the enlarged character pattern a rounding error arises at a right angle portion 150 of FIG. 10(b). The rounding error adversely affects the quality of the enlarged character pattern. By use of rectangular treatment system II at right angle portion 150, the rounding error is avoided. By preparing the reference table using where appropriate smooth treatment system I or rectangular treatment system II, transformed character patterns of high quality can be achieved. Treatment systems I and II provide essentially the same treatment to the character patterns shown in FIGS. 10(b) and (c) because each treatment is based on use of the same table. A plurality of different treatment systems can be applied to the reference table. Differences in the transformed character pattern arise when portions of the table are used by treatment system I rather than treatment system II and other portions of the table are used by treatment system II rather than treatment system I.

Operation of system 10 is as follows: As shown in FIG. 1, the size of the character pattern is selected in an m register 30 and a n register 32 with respect to the horizontal and vertical transformations which are to be made to the original character pattern. Each character pattern is inputted along input data line 75 and is synchronized with the input strobe signal applied to timing forming circuit 26. The input data inputted along input data line 75 is supplied by reference to a BUSY signal outputted by timing forming circuit 26 and determines whether system 10 is ready to receive input data representative of character pattern data along input data line 75. Initially, character pattern data in the form of a dot matrix which is to be enlarged or reduced is loaded into character register 12. The scale factor is set within registers 16 and 19 and signals for outputting 1/Kx and 1/Ky from registers 16 and 19 are initiated. Timing forming circuit 26 outputs clear signals along lines 87, 91, 105 and 109 to clear latch X 18, latch Y 21, X counter 28 and Y counter 27, respectively. Consequently, initializing values in latch X 18, latch Y 21, X counter 28 and Y counter 27 are provided. Pixel position operating portion 15 determines the pixel position of transformed pixel X. Simultaneously, character pattern gray scale 11 extracts the character pattern stored within character register 12 and inputs the same into character register 13. As soon as character pattern extraction treatment of pixels A, B, C and D is completed, pixel determiner 22 using the gray scale data for pixels A, B, C and D provided by character pattern gray scale portion 11 and the dx and dy values provided by pixel position operating portion 15 determines whether pixel X is to be colored (black) or uncolored (white). In accordance with a clock signal provided along line 111 from timing forming circuit 26 to shift register 25, shift register 25 temporarily stores the output from data selector 24 representing pixel X.

When the position of pixel X is calculated by pixel position operating portion 15, timing forming circuit 26 outputs a clock signal to X counter 28 by reference to the integer portion stored in latch X 18. FIGS. 11(a) and (b) illustrate the relationship between X counter 28 and this clock signal. When the position of pixel X crosses the position of pixel 0, in a vertical direction, one clock signal is outputted to X counter 28. Therefore, when the character pattern is to be enlarged, as shown in FIG. 11(a), either one clock signal or no clock signals are typically generated by timing forming circuit 26. When the character pattern is to be reduced, as shown in FIG. 11(b), one clock signal or two or more clock signals depending on the size of the reduction will be generated by timing forming circuit 26.

Pattern extraction by pattern extracter 14 within character pattern gray scale portion 11 is carried out in two steps so as to be synchronized with X counter 28 so that all pixels take part one by one. Incrementing of X counter 28 as discussed above is repeated until a complete horizontal line of the character pattern has been obtained. Once eight pixels X are obtained and temporarily stored in shift register 25 an output strobe signal provided by timing forming circuit 26 along line 115 is outputted to indicate that the eight pixels X are ready to be outputted from system 10.

The output from X counter 28 is provided to an X comparator 31. When X counter 28 reaches a value representing the end of one line of the transformed character pattern, X comparator 31 outputs an end signal to timing forming circuit 26. In response thereto, timing forming circuit 26 outputs clear signals to X counter 28 and latch X 18 along lines 105 and 87, respectively, and one clock signal along line 107 to Y counter 27. Thereafter, the next line of the character pattern within the dot matrix provided along input data line 75 is operated on by system 10 as discussed heretofore. Once the entire character pattern has been transformed, a Y comparator 33 which receives the output from Y counter 27 outputs an end signal to timing forming circuit 26. Transformation of the entire character pattern is now complete.

In the foregoing example, system 10 outputs data after all input data has been inputted and operated upon by gray scale portion 11. Although character registers 12 and 13 require the same amount of storage capacity, at least three lines of character pattern data need to be stored within registers 12 and 13 if gray scale data is to be outputted while character pattern data is provided along input data line 75. Character registers 12 and 13 can be used in common with a storage device which stores the reference table. In particular, there are 32 subtables within the 256 subtables of the reference table which are unnecessary and can be used for character registers 12 and 13. Consequently, storage of three lines of data for character registers 12 and 13 will not affect the circuitry and, in particular, the storage capacity required for system 10.

FIG. 12 illustrates the address table of data memory 23 for the reference table and character registers 12 and 13. The 13 bit address of character register 12 shown in FIG. 12 corresponds to the address portion of the row shown in FIG. 6(b). All values within subtables are 0 when the character pattern gray scale data at pixels A, B, C and D are no greater than 1. Transformed pixels determined to have gray scale data equal to a value of 0 do not require a subtable. Similarly, no subtables are required for transformed pixels whose address is determined to have a value of 1. When the character pattern gray scale data is at least equal to a value of 2, all values of the subtable have a value of 1. Under such circumstances, no subtable is required.

Figure 13:
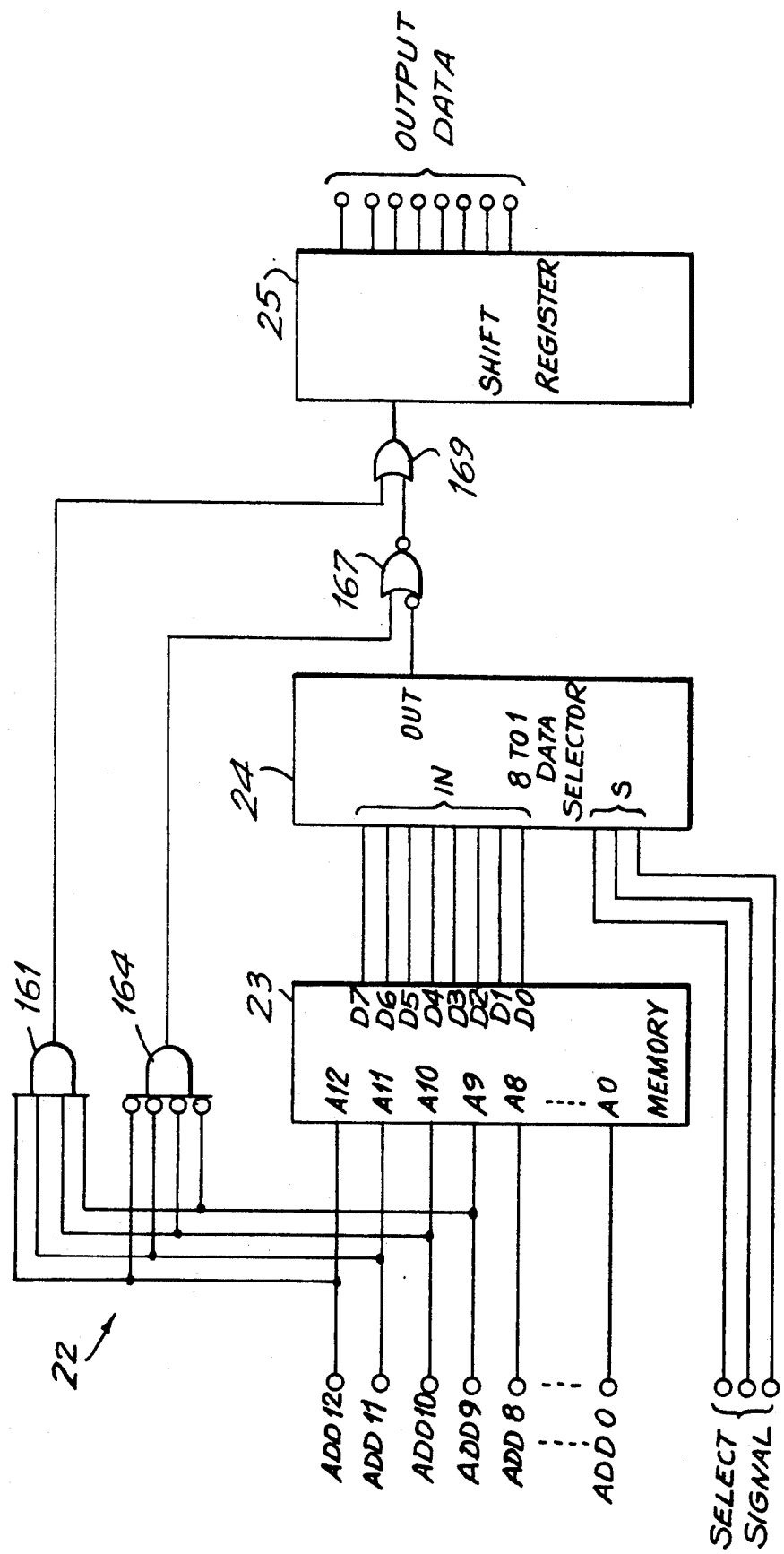
FIG. 13 is a block diagram of the pixel determiner of FIG. 1.

FIG. 13 illustrates the structure of pixel determiner 22. Line ADD 0 corresponds to the highest bit of distance dy, lines ADD 1-ADD 4 correspond to the four bits of distance dx, lines ADD 5-ADD 8 correspond to the low bits of pixels A, B, C and D and lines ADD 9-12 correspond to the high bits of pixels A, B, C and D, as shown in FIG. 6(b), respectively. The select signal is formed from the three lowest bits of distance dy as shown in FIG. 6(b). Lines ADD 0-12 are inputted to inputs A0-A12, respectively, of data memory 23. Outputs D0-D7 of data memory 23 are connected to the eight inputs of data selector 24. The select signal is inputted to the three S inputs of data selector 24. Lines ADD 9-12 are connected to inputs of an AND gate 16 and to inverted inputs of an AND gate 164. The output of data selector 24 is connected to an inverted input of a NOR gate 167. The output of AND gate 164 is connected to the other input of NOR gate 167. The output of NOR gate 167 is connected to an OR gate 169. The output of AND gate 161 is connected to another input of OR gate 169. The output or OR gate 169 is inputted to shift register 25. Shift register 25 outputs data along eight output terminals.

When all upper (high) bits of each address within memory 23, that is, lines ADD 9-12 are 0, the output of AND gate 161 will have a logic level of 0 and the output from AND gate 164 will have an output of logic level 1. Accordingly, the output from NOR gate 167 will have a logic level of 0 resulting in OR gate 169 having an output of logic level of 0. Therefore, when all upper bits of the address have a logic level of 0, pixel determiner 22 determines that transformed pixel X has a value of 0 (i.e. uncolored) regardless of the contents of data within memory 23. In contrast thereto, when all upper bits of the address have a logic level of 1, logic gate 169 will provide a logic level outputted to shift register 25 having a logic level of 1 (i.e. a black color) for transformed pixel X.

Referring once again to FIG. 1, a pointer register 29 stores the position by row and column of a pointer 231 (shown in FIG. 15) which is used for adjusting (i.e. arranging) the thickness of a transformed character pattern. Pointer register 29 is also used for arranging the thickness of an entire line of character patterns after enlargement or reduction has taken place. By adjusting the thickness of each character pattern after enlargement or reduction, a transformed character pattern of extremely high quality results.

Figure 14:
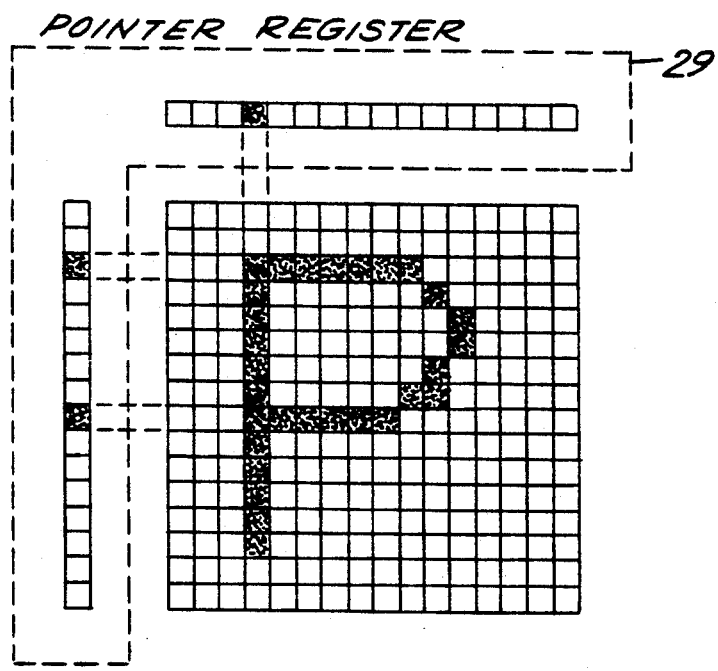
FIG. 14 illustrates a pointer register and corresponding dot matrix.

FIG. 14 illustrates pointer register 29 and the original character pattern inputted on input data line 75. After enlargement or reduction of the character pattern, each longitudinal line identified by pointer 231 will have the same thickness as two lateral lines identified by pointer 230. Additionally, a plurality of character patterns on the same line can be adjusted so that the same relative spacing between character patterns is maintained. It is therefore important that pointer 231 be able to identify those portions of each character pattern having gray scale data equal to a value of 1 (i.e. colored black).

Figure 15:
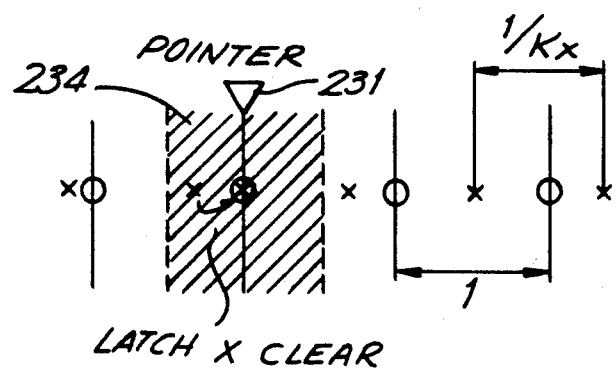
FIG. 15 diagrammatically illustrates a pointer positioned above a transformed character pattern.

FIG. 15 illustrates the operation of pointer 231. When the position of the transformed pixel comes into a hatching portion 234, a clear signal is outputted from timing forming circuit 26 along line 87 to latch X 18. Once pointer 231 has identified hatched area 234 (i.e. that portion of a transformed character colored black in a longitudinal/vertical direction) the thickness of the enlarged or reduced character can be determined based on the scale factor and the thickness of the original character regardless of the line position of the character. Enlarged or reduced characters of high quality results.

Figure 16:
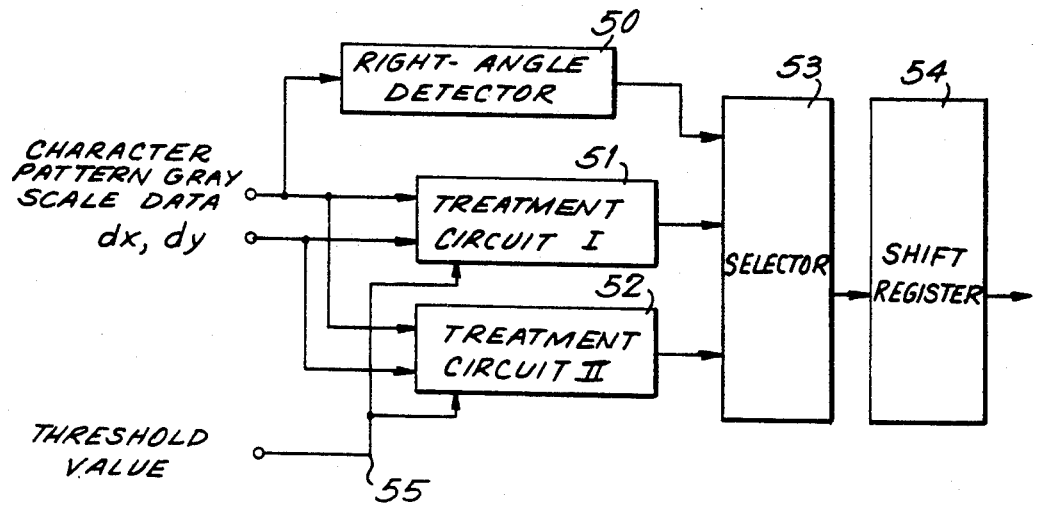
FIG. 16 illustrates the pixel determiner in accordance with another embodiment of the invention.

FIG. 16 illustrates an alternative embodiment of a pixel determiner 49 in which no reference table is required to determine whether the transformed character pattern is to be colored (black) or uncolored (white) but rather uses exclusive hardware. Pixel determiner 22 includes a right angle detector 50, treatment circuit 51 and treatment circuit 52. Character pattern gray scale data provided by portion 11 from points A, B, C and D which surround transformed pixel X and distances dx and dy are inputted to both treatment circuit 51 and treatment circuit 52 for calculating the gray scale data of transformed pixel X. The calculated gray scale data of transformed pixel X is represented by a binary value and compared to a threshold value provided through an external source along a line 55. Treatment circuit 51 provides a transformed pixel which is enlarged or reduced based on a smooth operation as described heretofore. Similarly, treatment circuit 52 enlarges or reduces the transformed pixel based on maintaining right angles within the character pattern as also discussed heretofore.

Figure 17:
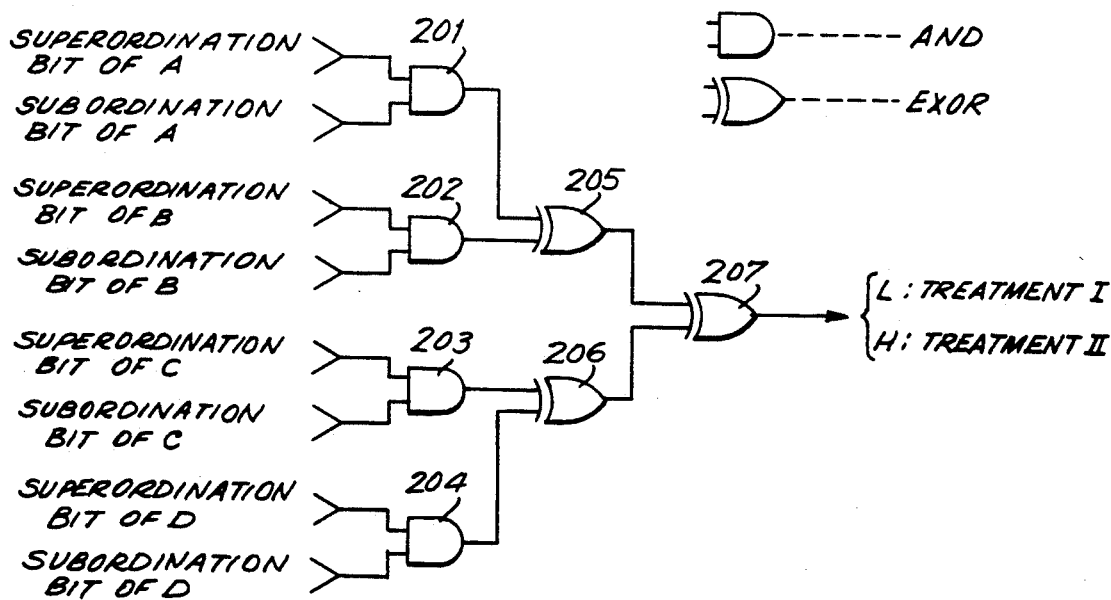
FIG. 17 illustrates the logic circuitry used in the right angle detector of FIG. 16.

Right angle detector 50 detects the right angles within each character pattern. A simplified circuit illustrating right angle detector 50 is shown in FIG. 17. Right angle detector 50 includes AND gates 201, 202, 203 and 204 and exclusive OR (EXOR) gates 205, 206 and 207. The pair of bits representing pixels A, B, C and D are provided to the inputs of AND gates 201-204, respectively. The outputs of AND gates 201 and 202 are connected to the inputs of EXOR gate 205 and the outputs of AND gates 203 and 204 are connected to the inputs of EXOR gate 206. The outputs of EXOR gates 205 and 206 are connected to the inputs of EXOR gate 207. The output of EXOR gate 207 is provided to the S input of a data selector 53. When a right angle portion of a character pattern is detected, right angle detector 50 will output, a high logic level through EXOR gate 207 which will be provided to a S input of data selector 53. Selection of the output from treatment circuit 52 by data selector 53 results. When right angle detector 50 detects a non-right angle of the character pattern, a low logic level will be outputted from EXOR gate 207 to the S input of data selector 53. Selection of treatment circuit 51 by data selector 53 results. A shift register 54 of pixel determiner 49 stores eight pixels of output data provided by data selector 53 which together are then provided as the output from system 10. The width of the enlarged or reduced character line can be further widened or shortened in thickness based on the threshold value provided to system 10 from outside of system 10. Therefore, widening or shortening of a enlarged or reduced character pattern can be achieved.

Figure 18:
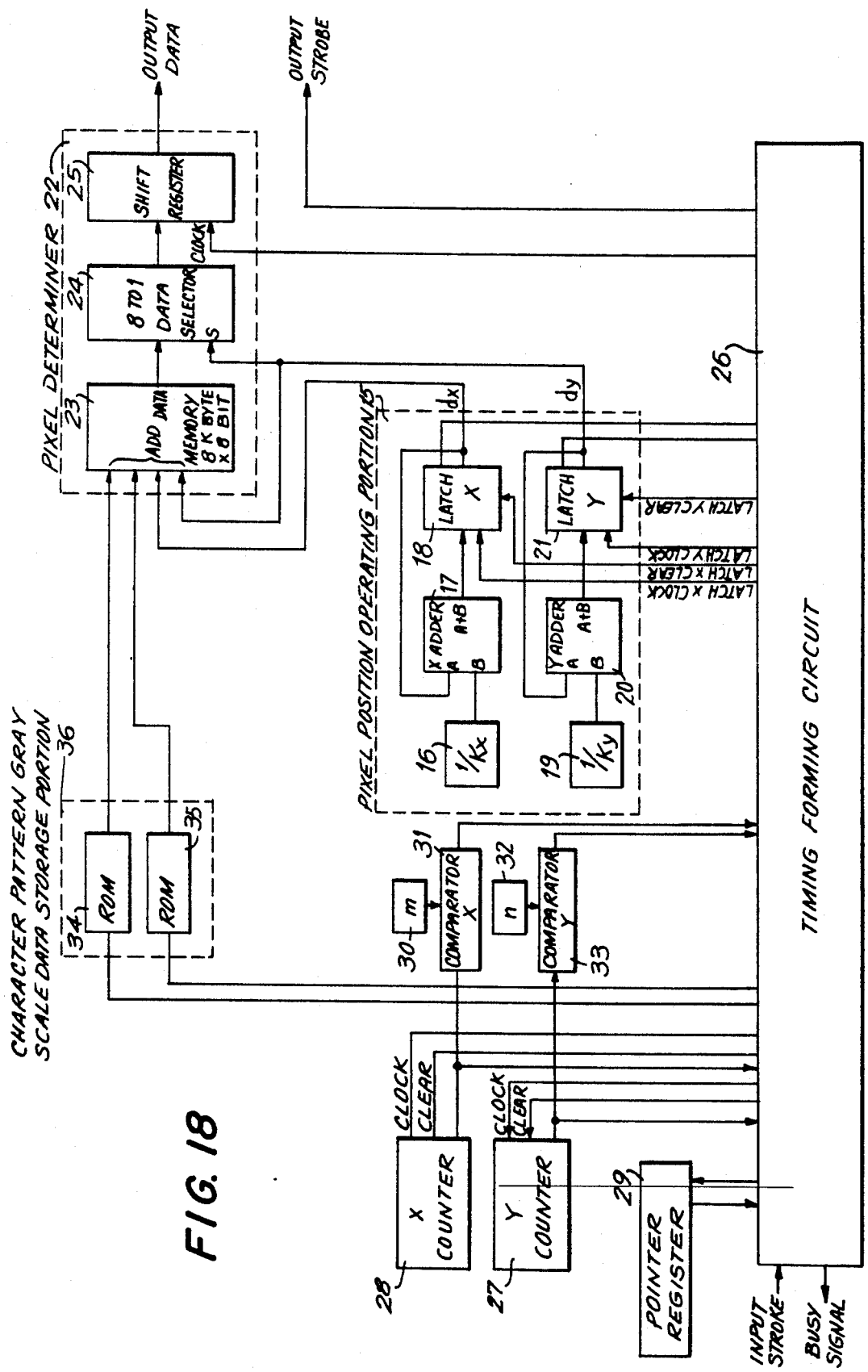
FIG. 18 illustrates a character pattern transforming system in accordance with an alternative embodiment of the invention.

An alternative embodiment of the invention is shown in FIG. 18 in which elements similar to those shown in FIG. 1 having like reference numerals are similar in construction and operation. In the alternative embodiment, a system 81 is substantially similar to system 10 except that a character pattern gray scale data storage portion 36 is used in place of character pattern gray scale portion 11. Gray scale data storage portion 36 includes a pair of read-only-memories (ROM) 34 and 35. The character pattern gray scale data includes two bits (i.e. superordination and subordination bits) per pixel, the superordination bit being stored within ROM 34 and the subordination being stored within ROM 35. The data stored in ROM 34 and in ROM 35 are the same as the character pattern data shown in FIGS. 2(a) and (b), respectively. If necessary, the gray scale data stored within ROM 34 and ROM 35 can be extracted and corrected by a user.

Figure 20:
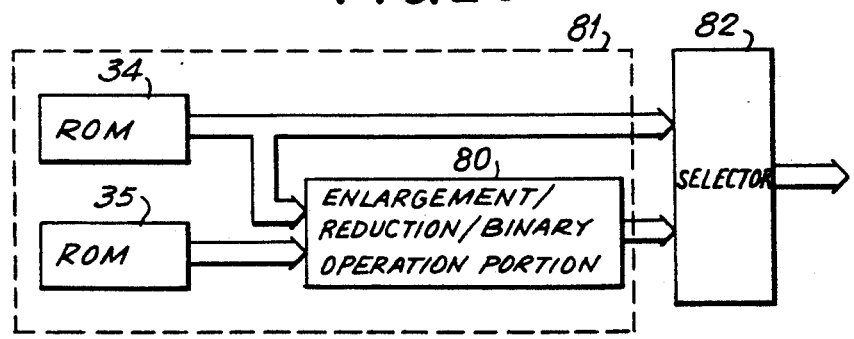
FIG. 20 is a character pattern transforming system in accordance with yet another alternative embodiment of the invention.

Functionally, the operation of ROM 34 and ROM 35 is illustrated in FIG. 20. Enlargement/reduction/binary value operation portion 80 represents all elements of system 81 except for ROM 34 and ROM 35. Character portion gray scale data is stored in both ROM 34 and ROM 35, the original size character pattern (i.e. having a scale factor equal to 1) being stored in ROM 34. Consequently, when the original size character pattern is requested, it can be selected by a selector 82 directly from ROM 34 without having to pass through enlargement/reduction/binary value operation portion 80. High speed read out of the original character pattern results.

When the original character pattern is to be enlarged or reduced in size, the character pattern gray scale data stored within ROM 34 and ROM 35 is inputted to enlargement/reduction/binary value operation portion 80 and then selected by selector 82. A central processing unit (not shown) controls system 81 and, in particular, can be used for controlling selector 82. Enlargement/reduction/binary value operation portion 80 functions similar to system 10 excluding gray scale portion 11.

System 81 provides enlarged or reduced character patterns at high speed and the extraction step which can consume an unnecessary period of time is eliminated. Additionally, the character pattern gray scale data can be chosen independent/freely by the user based on the user's aesthetic desires rather than on a predetermined basis by pattern extracter 14. Enlarged and/or reduced characters of high quality are obtained.

Figure 19A:
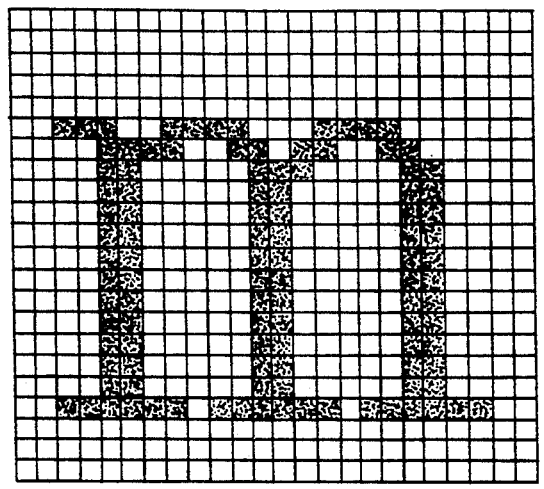
FIG. 19(a) is an example of the type of character pattern which can be stored in one of the read-only-memory devices of FIG. 18.
Figure 19B:
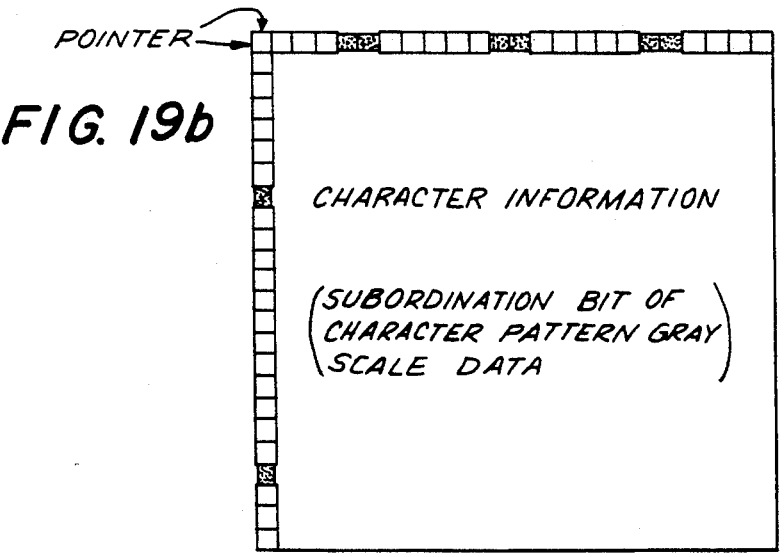
FIG. 19(b) illustrates the structure of another read-only-memory device of FIG. 18.

FIG. 19(a) illustrates, for exemplary purposes only, the contents of ROM 34. FIG. 19(b) shows the contents of ROM 35. ROM 34 stores only the original character pattern gray scale data or the superordination bits whereas ROM 35 stores both the subordination bits of character pattern gray scale data as well as pointer register 29. After enlargement or reduction of the character pattern, pointer 231 identifies the position for arranging/adjusting the thickness of the transformed character pattern by beginning at the upper left end of the matrix. The subordination bits of the character pattern gray scale data at the position where pointer 231 is stored are treated as having a gray scale data value of 0.

Both embodiments of the invention (FIGS. 1 and 18) have been described in which the character pattern gray scale data has two bits per pixel. The invention can also be used when the character pattern has three bits or more per pixel.

As now can be readily appreciated, the invention provides an optional-size character pattern transforming system for enlargement or reduction of a character pattern by converting the same into gray scale data of at least two bits. Coloring of each transformed pixel is based on the gray scale data from the original character pattern. Optional-size enlarged or reduced characters of high quality can be obtained at a high speed. After enlargement or reduction of the character pattern, each vertical line within the character pattern can be widened or shortened (i.e. thickness adjusted). Advantageously, the invention can be applied for printing by desk top publishing.

It will thus be seen that the objects set forth above, and those made apparent by the preceding description, are efficiently It will thus be seen that the objects set forth above, and those made apparent by the preceding description, are efficiently obtained and, since certain changes may be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language might be said to fall therebetween.

What is claimed is:

1. A character pattern transforming system, for changing the size of an original character pattern based on a scaling factor comprising:
   character pattern means for providing the original character pattern represented by a first dot matrix of pixels;
   gray scale means for converting, without use of the scaling factor, said original character pattern into character pattern gray scale data having at least three values per pixel; and
   pixel transformation means for producing a transformed dot matrix of pixels representing a transformed character pattern based on the character pattern gray scale data and the scaling factor.

2. The character pattern transforming system of claim 1, wherein the pixel transformation means includes pixel positioning means for determining the pixel positions of the transformed dot matrix based on a scaling factor applied to the original character pattern.

3. The character pattern transforming system of claim 2, wherein the pixel transformation means further includes pixel color determining means for determining the color of each pixel of the transformed dot matrix based on the character pattern gray scale data.

4. The character pattern transforming system of claim 1, wherein the gray scale means includes first register means for storing the original character pattern represented by the first dot matrix.

5. The character pattern transforming system of claim 4, wherein the gray scale means further includes second register means, the character pattern gray scale data being represented by a pair of bits, wherein the higher of the pair of bits are stored in the first register means and the lower of the pair of bits is stored in the second register means.

6. The character pattern transforming system of claim 1, wherein the gray scale means includes pattern extractor means for adjusting the gray scale data associated with the original character pattern.

7. The character pattern transforming system of claim 3, wherein said pixel color determining means includes detecting means for detecting right angel portions of the original character pattern based on the character pattern gray scale data.

8. The character pattern transforming system of claim 3, wherein said pixel color determining means includes memory means for storing reference table data which is based on the output from said gray scale means and said pixel positioning means.

9. The character pattern transforming system of claim 3, wherein said pixel color determining means includes memory means for storing reference table data associated with a plurality of pixels from the first dot matrix.

10. The character pattern transforming system of claim 9, wherein the pixel color determining means further includes selecting means for selecting reference table data representing one of said plurality of pixels of said transformed dot matrix.

11. The character pattern transforming system of claim 9, wherein said pixel color determining means further includes selecting means and shift register means, said selecting means selecting reference table data stored within said memory means, said shift register means operable for storing a plurality of reference table data selected by said selecting means.

12. The character pattern transforming system of claim 11, further including logic means for providing predetermined reference table data to said shift register regardless of the reference table data selected by said selecting means in response to certain predetermined character pattern gray scale data being supplied to said memory means.

13. The character pattern transforming system of claim 1, further including correction means for adjusting the thickness of the transformed character pattern.

14. The character pattern transforming system of claim 13, wherein the correction means includes storage means for storing the position of each character whose thickness is to be adjusted.

15. The character pattern transforming system of claim 13, wherein the correction means includes pointing means for identifying that portion of the transformed dot matrix representing the transformed character pattern whereby the correction means adjusts the thickness of the identified portion based on the scaling factor to be applied to the original character pattern following identification by the pointing means.

16. The character pattern transforming system of claim 1, further including first treatment means for smoothing the periphery of the transformed character pattern and second treatment means for providing right angle corners along the periphery of the transformed character pattern corresponding to the right angle corners of the original character pattern.

17. The character pattern transforming system of claim 16, further including right angle detecting means for detecting the right angle corners of the original character pattern based on character pattern gray scale data and further including treatment selecting means for selecting between the first treatment means and the second treatment means in response to the right angle detecting means.

18. The character pattern transforming system of claim 17, wherein the right angle detecting means determines right angle corners of the original character pattern based on character pattern gray scale data from a plurality of pixels of the original character pattern associated with each pixel of the transformed character pattern.

19. The character pattern transforming system of claim 5, wherein the gray scale means includes pattern extractor means for adjusting the gray scale data associated with the original character pattern.

20. The character pattern transforming system of claim 1, wherein said pixel transformation means includes pixel color determining means for determining the color of each pixel of the transformed dot matrix based on character pattern gray scale data, said pixel color determining means including detecting means for detecting right angle portions of the original character pattern based on the character pattern gray scale data.

21. The character pattern transforming system of claim 20, wherein said pixel color determining means includes memory means for storing reference table data which is based, in part, on the output from said gray scale means.

22. The character pattern transforming system of claim 20, wherein said pixel color determining means includes memory means for storing for each pixel within said transformed dot matrix reference table data associated with a plurality of pixels of said first dot matrix.

23. The character pattern transforming system of claim 22, wherein said pixel color determining means further includes selecting means and shift register means, said selecting means selecting reference table data stored within said memory means, said shift register means operable for storing a plurality of reference table data selected by said selecting means.

24. The character pattern transforming system of claim 23, further including logic means for providing predetermined reference table data to said shift register regardless of the reference table data selected by said selecting means in response to certain predetermined character pattern gray scale data being supplied to said memory means.

25. The character pattern transforming system of claim 6, further including correction means for adjusting the thickness of the transformed character pattern.

26. The character pattern transforming system of claim 25, wherein the correction means includes pointing means for identifying that portion of the transformed dot matrix representing the transformed character pattern whereby the correction means adjusts the thickness of the identified portion based on the scaling factor to be applied to the original character pattern following identification by the pointing means.

27. The character pattern transforming system of claim 6, further including first treatment means for smoothing the periphery of the transformed character pattern and second treatment means for providing right angle corners along the periphery of the transformed character pattern corresponding to the right angle corners of the original character pattern.

28. The character pattern transforming system of claim 27, further including right angle detecting means for detecting the right angle corners of the original character pattern based on character pattern gray scale data and further including treatment selecting means for selecting between the first treatment means and the second treatment means in response to the right angle detecting means.

29. The character pattern transforming system of claim 28, wherein the right angle detecting means determines right angle corners of the original character pattern based on character pattern gray scale data from a plurality of pixels of the original character pattern associated with each pixel of the transformed character pattern.

30. A character pattern transforming system, comprising:
means for providing an original character pattern represented by a first dot matrix of pixels;
gray scale means for extracting from the first dot matrix of pixels the original character pattern and producing character pattern gray scale data having at least ternary values per pixel; said gray scale means including pattern extractor means for adjusting the gray scale data associated with the original character pattern;
pixel positioning means for determining the pixel positions of a second dot matrix of pixels representing a transformed character pattern based on a scaling factor applied to the original character pattern;
pixel color determining means for determining the color of each pixel of the transformed character pattern within the second dot matrix of pixels based on the character pattern gray scale data; said pixel color determining means including detecting means for detecting right angle portions of the original character pattern based on the character pattern gray scale data, memory means for storing reference table data which is based on the output from said gray scale means and said pixel positioning means, selecting means and shift register means, said selecting means selecting reference table data stored within said memory means, said shift register means operable for storing a plurality of reference table data selected by said selecting means;
correction means for adjusting the thickness of the transformed character pattern;
first treatment means for smoothing the periphery of the transformed character pattern and second treatment means for providing right angle corners along the periphery of the transformed character pattern corresponding to the right angle corners of the original character pattern; and
treatment selecting means for selecting between the first treatment means and the second treatment means in response to the detecting means of the pixel color determining means;
wherein the character pattern gray scale data is produced without use of the scaling factor by the gray scale means.

31. A character pattern transforming system for changing the size of an original character pattern based on a scaling factor comprising:
means for providing the original character pattern represented by a first dot matrix;
gray scale storage means for storing the original character pattern as character pattern gray scale data having four values per pixel; and
pixel transformation means for producing a transformed dot matrix of pixels representing a transformed character pattern based on the character pattern gray scale data and the scaling factor;
wherein the character pattern gray scale data is not based on the scaling factor.

32. The character pattern transforming system of claim 31, wherein the pixel transformation means includes pixel positioning means for determining the pixel positions of the transformed dot matrix based on a scaling factor applied to the original character pattern.

33. The character pattern transforming system of claim 32, wherein the pixel transformation means further includes pixel color determining means for determining the color of each pixel of the transformed character pattern within the transformed dot matrix based on the character pattern gray scale data.

34. The character pattern transforming system of claim 31, wherein said gray scale storage means includes a pair of storage means, one of said pair of storage means operable for storing said original character pattern data.

35. The character pattern transforming system of claim 31, further including selecting means for selecting between said transformed character pattern and said original character pattern.

36. The character pattern transforming system of claim 34, wherein said pair of storage means are read-only-memory type devices.

37. The character pattern transforming system of claim 33, wherein said pixel color determining means includes detecting means for detecting right angle portions of the original character pattern based on the character pattern gray scale data.

38. The character pattern transforming system of claim 33, wherein said pixel color determining means includes memory means for storing reference table data representing the color of each pixel within the transformed dot matrix.

39. The character pattern transforming system of claim 33, wherein said pixel color determining means includes memory means for storing matrix reference table data associated with a plurality of pixels from said first dot matrix.

40. The character pattern transforming system of claim 39, wherein said pixel color determining means further includes selecting means and shift register means, said selecting means selecting reference table data stored within said memory means, said shift register means operable for storing a plurality of reference table data selected by said selecting means.

41. The character pattern transforming system of claim 40, wherein said pixel color determining means further includes logic means for providing predetermined reference table data to said shift register regardless of the reference table data selected by said selecting means in response to certain predetermined character pattern gray scale data being supplied to said memory means.

42. The character pattern transforming system of claim 41, further including correction means for adjusting the thickness of the transformed character pattern.

43. The character pattern transforming system of claim 42, further including first treatment means for smoothing the periphery of the transformed character pattern and second treatment means for providing right angle corners along the periphery of the transformed character pattern corresponding to the right angle corners of the original character pattern.

44. The character pattern transforming system of claim 43, further including right angle detecting means for detecting the right angle corners of the original character pattern based on character pattern gray scale data and further including treatment selecting means for selecting between the first treatment means and the second treatment means in response to the right angle detecting means.

45. The character pattern transforming system of claim 31, further including correction means for adjusting the thickness of the transformed character pattern.

46. The character pattern transforming system of claim 31, further including first treatment means for smoothing the periphery of the transformed character pattern and second treatment means for providing right angle corners along the periphery of the transformed character pattern corresponding to the right angle corners of the original character pattern.

47. The character pattern transforming system of claim 46, further including right angle detecting means for detecting the right angle corners of the original character pattern based on character pattern gray scale data and further including treatment selecting means for selecting between the first treatment means and the second treatment means in response to the right angle detecting means.

48. A method of transforming a character pattern within a matrix of pixels comprising:
   storing the character pattern based on its initial gray scale data within a first storage device;
   extracting the character pattern from the first storage device;
   adjusting the initial gray scale data associated with the extracted character pattern to create an adjusted gray scale for the extracted character pattern;
   storing the character pattern based on the adjusted gray scale in a second storage device;
   determining the new position of each pixel within the matrix based on a scaling factor corresponding to the transformation; and
   determining whether to color the position of each pixel within the transformed character based on the initial and adjusted gray scale data;
   wherein the adjusted gray scale is created without use of the scaling factor.

* * * * *